US011993374B2

(12) United States Patent
Lee

(10) Patent No.: US 11,993,374 B2
(45) Date of Patent: May 28, 2024

(54) DRONE CONTROL SYSTEM

(71) Applicant: Sang Chul Lee, Seoul (KR)

(72) Inventor: Sang Chul Lee, Seoul (KR)

( * ) Notice: Subject to any disclaimer, the term of this patent is extended or adjusted under 35 U.S.C. 154(b) by 266 days.

(21) Appl. No.: 17/151,813

(22) Filed: Jan. 19, 2021

(65) Prior Publication Data
US 2022/0111961 A1  Apr. 14, 2022

(30) Foreign Application Priority Data

Oct. 13, 2020  (KR) .................. 10-2020-0132007

(51) Int. Cl.
*B64C 39/02* (2023.01)
*B64U 10/13* (2023.01)
*B64U 50/19* (2023.01)
*H02P 6/08* (2016.01)
*H02P 6/10* (2006.01)

(52) U.S. Cl.
CPC .............. *B64C 39/024* (2013.01); *H02P 6/08* (2013.01); *H02P 6/10* (2013.01); *B64U 10/13* (2023.01); *B64U 50/19* (2023.01); *B64U 2201/20* (2023.01)

(58) Field of Classification Search
CPC . B64C 39/024; H02P 6/08; H02P 4/00; H02P 7/00; H02P 8/14; H02P 29/00; H02P 21/00; H02P 2205/00; B64U 10/13; B64U 2201/20; B64U 50/19
See application file for complete search history.

(56) References Cited

U.S. PATENT DOCUMENTS

2016/0280386 A1* 9/2016 Mestler ................. B64D 31/06
2020/0266743 A1* 8/2020 Li ........................ G05B 13/027

FOREIGN PATENT DOCUMENTS

| JP | 2009-023629 A | 2/2009 |
| KR | 10-2016-0029752 | 3/2016 |
| KR | 10-2019-0000771 | 1/2019 |
| KR | 10-2019-0051896 | 5/2019 |

(Continued)

OTHER PUBLICATIONS

S. Atoev, K.-R. Kwon, S.-H. Lee and K.-S. Moon, "Data analysis of the MAVLink communication protocol," 2017 International Conference on Information Science and Communications Technologies (ICISCT), Tashkent, Uzbekistan, 2017, pp. 1-3, (Year: 2017).*

(Continued)

*Primary Examiner* — Said Bouziane
(74) *Attorney, Agent, or Firm* — ANTONIO HA & U.S. PATENT, LLC

(57) ABSTRACT

According to an embodiment of the disclosure, there is provided a drone control system in which the drone user may directly adjust the torque required in the flight environment, that is, the torque required by the drone motor, with the transmitter control when controlling the transmitter stick. According to an embodiment, a drone control system comprises a flight controller receiving a stick control value from a transmitter, converting the stick control value into a motor speed value, and outputting the motor speed value and an electronic speed controller receiving the motor speed value from the flight controller, converting the motor speed value into a motor torque value, converting the motor torque value into a power driving value, and outputting the power driving value to a motor.

11 Claims, 8 Drawing Sheets

(56) References Cited

FOREIGN PATENT DOCUMENTS

KR    10-2020-0041142    4/2020
WO    WO2018/053680     3/2018

OTHER PUBLICATIONS

English Specification of JP2009-023629A.
English Specification of 10-2016-0029752.
English Specification of 10-2019-0000771.
English Specification of 10-2019-0051896.
English Specification of 10-2020-0041142.
Development of a motor speed controller of drones considering voltage drop of battery, by Sunghee Lee et al., published by Korea Information Science Society, 44(6), 2017-6, 601-606 (6 pages).

* cited by examiner

DRONE CONTROL SYSTEM

CROSS-REFERENCE TO RELATED APPLICATIONS

This application is based on and claims priority under 35 U.S.C. 119 to Korean Patent Application No. 10-2020-0132007, filed on Oct. 13, 2020, in the Korean Intellectual Property Office, the disclosure of which is herein incorporated by reference in its entirety.

TECHNICAL FIELD

Embodiments of the disclosure relates to drone control systems.

DESCRIPTION OF RELATED ART

Drones are aircraft that fly by remote control without a person on board or fly autonomously along a designated route, and have been mainly used for military purposes and are recently adopted in various sectors including transportation or security or other personal purposes.

The rotational speed of the motor installed in the drone is generally controlled by speed command values. However, since such motor speed control determines the rotational speed of the motor irrespective of changes in the flight environments (for example, the weather environment), the drone may not be effectively controlled. Moreover, for drones without a motor rotor position sensor and a speed sensor, estimated speed values, rather than precise speed values, are used to control, and such methods have difficulty in precisely controlling the drone.

The description disclosed in the Background section is only for a better understanding of the background of the invention and may also include information which does not constitute the prior art.

SUMMARY

According to an embodiment of the disclosure, there is provided a drone control system in which the drone user may directly adjust the torque required in the flight environment, that is, the torque required by the drone motor, with the transmitter control when controlling the transmitter stick.

According to an embodiment of the disclosure, there is provided a drone control system capable of controlling the drone by torque commands even in automatic flight as well as controlling on a transmitter-equipped controller.

According to an embodiment of the disclosure, there is provided a drone control system that may control the motor with the torque required in a flight controller when the drone hovers (automatic drone position control).

According to an embodiment of the disclosure, there is provided a drone control system in which the torque required for position control and flight speed control of the drone continuously varies when the flight environment (wind or weather changes) continues to change.

According to an embodiment of the disclosure, there is provided a drone control system which has advantages in position control accuracy and flight speed control as compared with conventional speed controlled drones by allowing the user to directly control the varying motor torque using a transmitter.

According to an embodiment of the disclosure, there is provided a drone control system capable of enhancing drone control efficiency by adopting a torque control scheme.

According to an embodiment of the disclosure, there is provided a drone control system capable of suppressing the drone shaking when the drone hovers while increasing the drone position control accuracy and control quickness by adopting a torque control scheme.

According to an embodiment of the disclosure, there is provided a drone control system capable of enhancing control accuracy and flight stability in light of controller bandwidth.

According to an embodiment, a drone control system comprises a flight controller receiving a stick control value from a transmitter, converting the stick control value into a motor speed value, and outputting the motor speed value, and an electronic speed controller receiving the motor speed value from the flight controller, converting the motor speed value into a motor torque value, converting the motor torque value into a power driving value, and outputting the power driving value to a motor.

According to an embodiment, the electronic speed controller may include a speed-torque converter converting the motor speed value into the motor torque value and outputting the converted motor torque value, a torque controller converting the motor torque value into a motor current value and outputting the converted motor current value, and a power converter converting the motor current value into the motor power driving value and outputting the converted motor power driving value.

According to an embodiment, the speed-torque converter converts the motor speed value into the motor torque value using a torque value characteristic for each speed of the motor uniquely designed per motor.

According to an embodiment, the drone control system may further comprise a summing circuit between the speed-torque converter and the torque controller and receiving feedback of a current value of the motor proportional to the torque value.

According to an embodiment, the motor speed value output from the flight controller to the electronic speed controller may include a communication protocol.

According to an embodiment, the electronic speed controller identifies the communication protocol and then converts the motor speed value into the motor torque value according to the identified communication protocol.

According to an embodiment, the communication protocol may include one of standard PWM, oneshot125, oneshot42, multishot, Proshot or Dshot communication protocols.

According to an embodiment, the motor may include a motor controlled by a vector control method.

According to an embodiment, a drone control system comprises a flight controller receiving a stick control value from a transmitter, converting the stick control value into a motor speed value, converting the motor speed value into a motor torque value, and outputting the motor torque value, and an electronic speed controller receiving the motor torque value from the flight controller, converting the motor torque value into a power driving value, and outputting the power driving value to a motor.

According to an embodiment, the flight controller may include a speed-torque converter converting the motor speed value into the motor torque value and outputting the converted motor torque value. The electronic speed controller may include a torque controller converting the motor torque value into a motor current value and outputting the converted motor current value, and a power converter converting the motor current value into the motor power driving value and outputting the converted motor power driving value.

According to an embodiment, the speed-torque converter converts the motor speed value into the motor torque value using a torque value characteristic for each speed of the motor uniquely designed per motor.

According to an embodiment, the drone control system may further comprise a summing circuit between the speed-torque converter and the torque controller and receiving feedback of a current value of the motor proportional to the torque value.

According to an embodiment, the motor may include a motor controlled by a vector control method.

According to an embodiment, a drone control system comprises a flight controller converting a motor speed value into a motor torque value and outputting the motor torque value, and an electronic speed controller receiving the motor torque value from the flight controller, converting the motor torque value into a power driving value, and outputting the power driving value to a motor.

According to an embodiment, the flight controller may include a speed-torque converter converting the motor speed value into the motor torque value and outputting the converted motor torque value. The electronic speed controller may include a torque controller converting the motor torque value into a motor current value and outputting the converted motor current value, and a power converter converting the motor current value into the motor power driving value and outputting the converted motor power driving value.

According to an embodiment, the flight controller and the electronic speed controller are integrated into one system.

According to an embodiment of the disclosure, there is provided a drone control system in which the drone user may directly adjust the torque required in the flight environment, that is, the torque required by the drone motor, with the transmitter control when controlling the transmitter stick.

According to an embodiment of the disclosure, there is provided a drone control system capable of control using torque commands even in automatic flight as well as control on transmitter.

According to an embodiment of the disclosure, there is provided a drone control system controlling the motor with the torque necessary for the flight controller when the drone hovers (automatic drone position control).

According to an embodiment of the disclosure, there is provided a drone control system in which the torque required for position control and flight speed control of the drone continuously varies when the flight environment (wind or weather changes) continues to change.

According to an embodiment of the disclosure, there is provided a drone control system which has advantages in position control accuracy and flight speed control as compared with conventional speed controlled drones by allowing the user to directly control the varying motor torque using a transmitter.

According to an embodiment of the disclosure, there is provided a drone control system capable of enhancing drone control efficiency by adopting a torque control scheme.

According to an embodiment of the disclosure, there is provided a drone control system capable of increasing drone position control accuracy by adopting a torque control system, thereby suppressing the drone shaking when the drone hovers.

According to an embodiment of the disclosure, there is provided a drone control system capable of enhancing control accuracy and flight stability in light of controller bandwidth.

According to an embodiment of the disclosure, there is provided a drone control system which may enhance system efficiency, thus increasing the battery time of the drone and providing better accuracy in drone position control.

According to an embodiment of the disclosure, there is provided a drone control system that may reduce drone shaking and thus provides advantages in light of flight stability.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
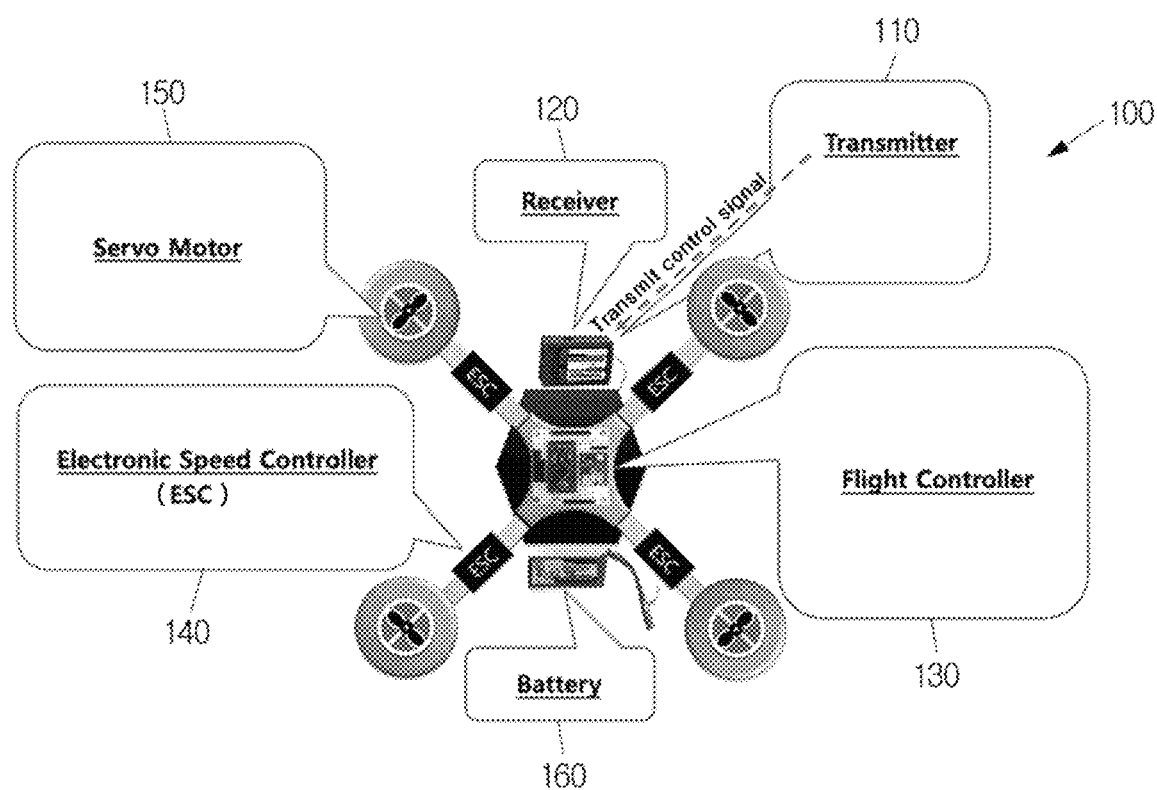
FIG. 1 is a view schematically illustrating a configuration of a drone.

Hereinafter, embodiments of the present invention are described in detail with reference to the accompanying drawings.

Embodiments of the disclosure are provided to thoroughly explain the disclosure to those skilled in the art, and various modifications may be made thereto, and the scope of the present invention is not limited thereto. Embodiments of the disclosure are provided to fully and thoroughly convey the spirit of the present invention to those skilled in the art.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the present invention. As used herein, the singular forms "a,"

"an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

As described herein, the controller and/or other related devices or parts may be implemented in hardware, firmware, application specific integrated circuits (ASICs), software, or a combination thereof. For example, the controller and/or other related devices or parts or its or their components may be implemented in a single integrated circuit (IC) chip or individually in multiple IC chips. Further, various components of the controller may be implemented on a flexible printed circuit board, in a tape carrier package, on a printed circuit board, or on the same substrate as the controller. Further, various components of the controller may be processes, threads, operations, instructions, or commands executed on one or more processors in one or more computing devices, which may execute computer programming instructions or commands to perform various functions described herein and interwork with other components. The computer programming instructions or commands may be stored in a memory to be executable on a computing device using a standard memory device, e.g., a random access memory (RAM). The computer programming instructions or commands may be stored in, e.g., a compact-disc read only memory (CD-ROM), flash drive, or other non-transitory computer readable media. It will be appreciated by one of ordinary skill in the art that various functions of the computing device may be combined together or into a single computing device or particular functions of a computing device may be distributed to one or other computing devices without departing from the scope of the present invention.

FIG. 1 is a view schematically illustrating a configuration of a drone 100.

Referring to FIG. 1, a drone 100 may include a transmitter 110 for transmitting stick control signals, a receiver 120 for receiving control signals from the transmitter 110, a flight controller 130 for receiving stick control signals from the receiver 120 and outputting various control signals corresponding to the control signals, an electronic speed controller 140 for receiving control signals from the flight controller 130 to control the torque of the motor (in contrast, conventional drone systems control the speed of the motor), a motor 150 for receiving torque (in contrast, conventional drone systems control speed) control signals from the electronic speed controller 140 to rotate the propeller, and a battery 160 for supplying power to the receiver 120, the flight controller 130, the electronic speed controller 140, and the motor 150.

Figure 2:
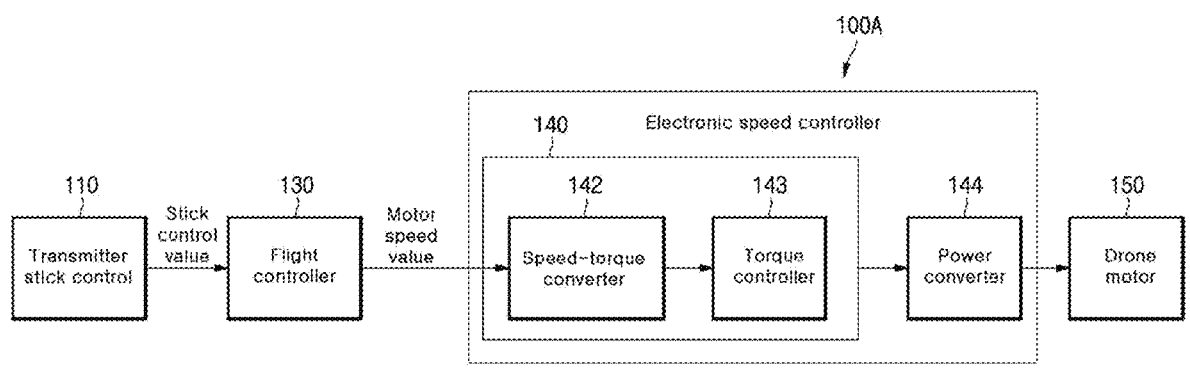
FIG. 2 is a block diagram illustrating a configuration of a drone control system according to an embodiment of the disclosure.

FIG. 2 is a block diagram illustrating a control sequence of a drone control system 100A according to an embodiment of the disclosure.

Referring to FIG. 2, according to an embodiment, the drone control system 100A may include a transmitter 110, a flight controller 130, an electronic speed controller 140, and a motor 150.

The transmitter 110 is a device used by the user to control the drone 100 and serves to transmit a stick control value by the user to the flight controller 130. In some examples, the transmitter 110 may include, or be referred to as, a manipulator or control stick.

The flight controller 130 receives a stick control value from the transmitter 110 using, e.g., the receiver 120, converts the stick control value into a motor speed value, and outputs the motor speed value to the electronic speed controller 140. The flight controller 130 may also output a control command value calculated for internally controlling position and posture to the electronic speed controller 140.

In some examples, the flight controller 130 may analyze and calculate signals detected from various sensors mounted on the drone 100 and periodically output signals to the electronic speed controller 140 so that the drone 100 may stably perform position control. In some examples, two signals, e.g., a signal received by the receiver 120 and a signal received from a sensor, may be analyzed and calculated, and signals may be output to the electronic speed controller 140 to perform the flight desired by the user.

In some examples, the flight controller 130 is a central processing unit that processes flight and overall operation in the drone 100, and a signal value sent to the electronic speed controller 140 is a value for controlling the motor 150 of the drone 100. In some examples, the input value transmitted from the flight controller 130 to the electronic speed controller 140 is a motor speed command value for controlling the motor 150 of the drone 100.

The electronic speed controller 140 receives the motor speed value from the flight controller 130, converts the motor speed value into a motor torque value, converts the motor torque value into a power driving value, and outputs the power driving value to the motor 150. In some examples, the electronic speed controller 140 may include, or be referred to as, a torque controller or transmission.

According to an embodiment, the electronic speed controller 140 may internally convert a speed command into a torque command, or may directly receive a torque command from the flight controller 130 and control the motor 150 with the torque command.

In some examples, the electronic speed controller 140 may include a micro control unit (MCU) 141 and a power converter 144. The MCU 141 may include a speed-torque converter 142 and a torque controller 143. In some examples, the speed-torque converter 142 and torque controller 143 in the MCU 141 may be implemented by software with an algorithm. In some examples, control logic related to the control of the motor 150 is processed in the MCU 141.

The speed-torque converter 142 of the MCU 141 converts the motor speed value into a motor torque value and outputs the motor torque value to the torque controller 143. In some examples, the speed-torque converter 142 scales the motor speed command value received from the flight controller 130 into a torque value and outputs the scaled torque value to the torque controller 143. For example, the speed-torque converter 142 converts and calculates the motor speed command value into a torque value suitable for the characteristics of each motor, and outputs the torque value to the torque controller 143. In some examples, the speed-torque converter 142 may convert the motor speed value into the motor torque value using torque value characteristics for each speed of the motor 150 which reflects unique characteristics for each motor 150.

The torque controller 143 of the MCU 141 converts the motor torque value into a motor current control value and outputs the motor current control value to the power converter 144. In some examples, the torque controller 143 may include, or be referred to as, a current controller as it converts a torque command into a current command.

The following torque formula has a formula proportional to the current factor as follows, and in sensing the output of the motor 150, current sensing is relatively easier than torque sensing, so that the torque controller 143 may be configured as a current controller according to an embodiment.

$$T = \frac{P}{2}\frac{3}{2}(\Phi_f i_q + (L_d - L_q)i_d i_q)$$

where T is the torque, P is the number of poles of the motor, iq is the q-axis current, id is the d-axis current, Ld is the d-axis inductance, Lq is the q-axis inductance, and $\Phi_f$ is the permanent magnet armature flux linkage.

Here, the number of poles and inductance values of the motor 150 are constant values.

The power converter 144 converts and outputs actual motor power according to the motor current control value. The power converter 144 may include typical or conventional transistor(s) TR, field-effect transistor(s) FET, metal-oxide-semiconductor FET(s) MOSFET, insulated-gate bipolar transistor(s) IGBT, and one or more power semiconductors and other devices or elements and supplies power corresponding to the motor current control value to the motor 150.

The motor 150 receives the power corresponding to the motor torque value from the electronic speed controller 140 and rotates the propeller or propellant. In some examples, the motor 150 may include a motor 150 controlled by vector control logic rather than a brushless DC motor (BLDC) control (for example, a permanent magnet synchronous motor (PMSM) or an interior permanent magnet (IPM) motor). Here, vector control is a method for controlling a three-phase alternating current (AC) motor, and this method may include a method for applying a current to the stator winding so that flux is continuously generated in the permanent magnet of the rotor perpendicular to the stator field.

According to an embodiment, the torque according to the speed is directly controlled on the motor considering that the torque characteristics according to the speed differ for each PMSM or IPM motor.

Figure 3:
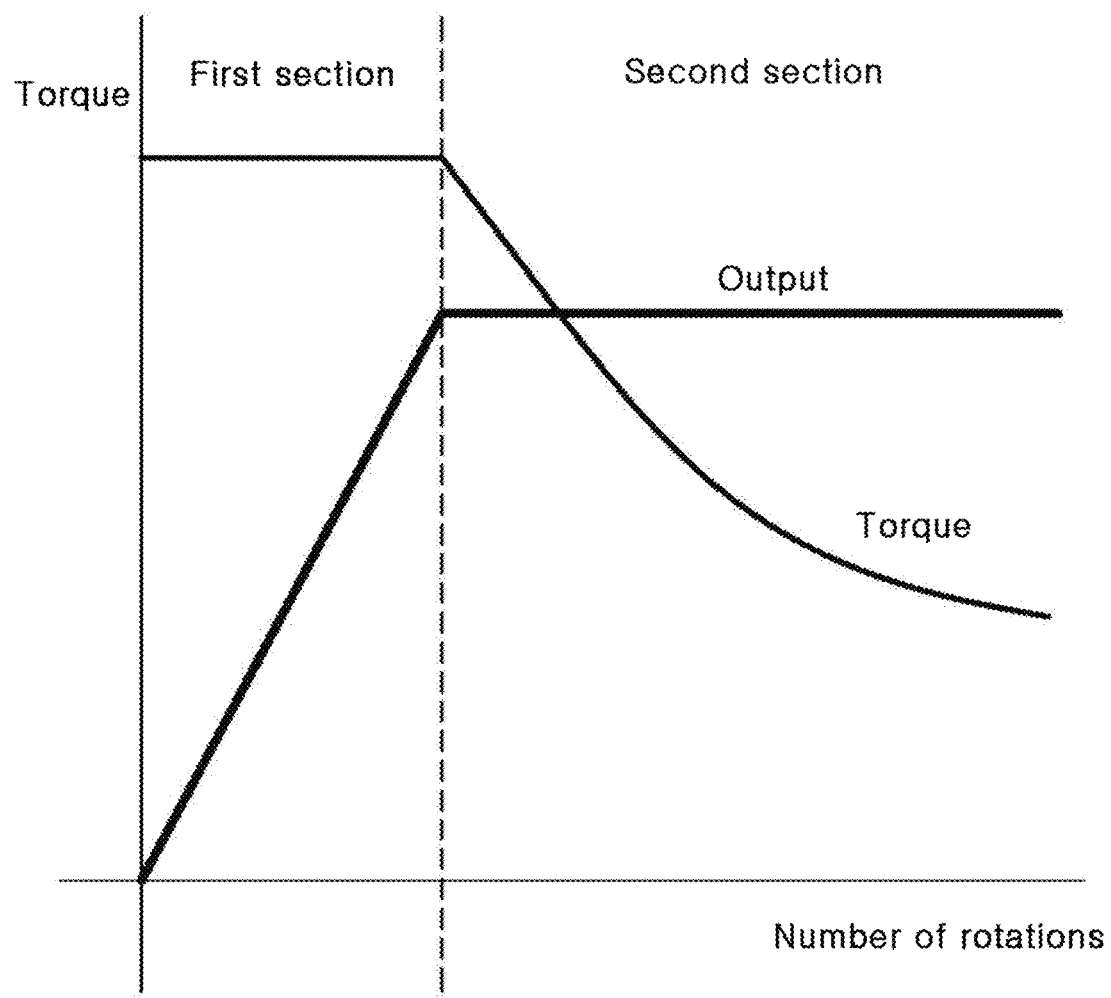
FIG. 3 is a graph illustrating characteristics (TN curve) of torque for each rotational speed of a motor in a drone control system according to an embodiment of the disclosure.

FIG. 3 is a graph illustrating the characteristics of torque for each rotational speed of the motor 150 in the drone control system 100A according to an embodiment of the disclosure. Here, the X-axis denotes the number of rotations of the motor (e.g., revolutions per minute (RPM)), and the Y-axis denotes the output (e.g., power) and torque of the motor.

As illustrated in FIG. 3, the X-axis may be divided into a first section and a second section based on output and torque. In the first section, the output of the motor is substantially proportional to the number of rotations of the motor and, in the second section, the motor output is constant while the number of rotations of the motor may increase. In the first section, the torque of the motor is constant while the number of rotations of the motor may increase and, in the second section, the torque of the motor and the number of rotations of the motor may be substantially inversely proportional to each other. Such motor output, motor torque, and motor rotation speed may differ for each motor type. Accordingly, such characteristics related to output, torque, and rotational speed may be previously stored in a memory of the speed controller 140.

Figure 4:
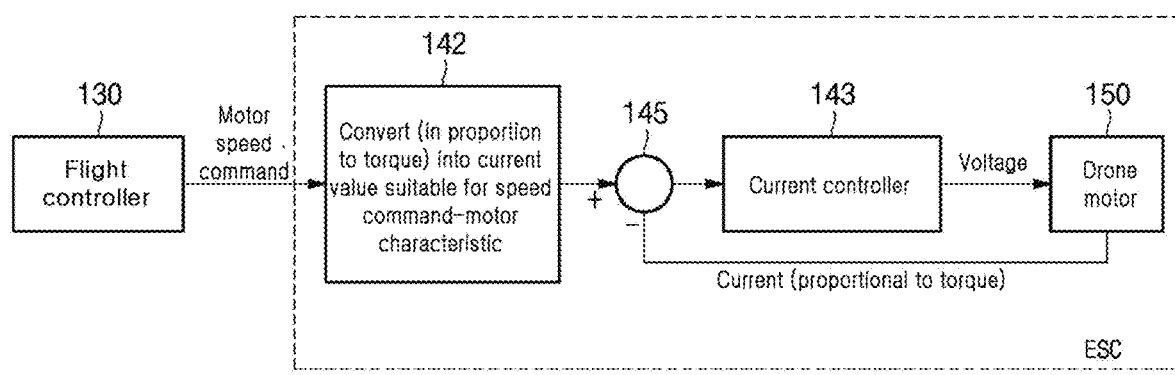
FIG. 4 is a block diagram illustrating a control sequence of a drone control system according to an embodiment of the disclosure.

FIG. 4 is a block diagram illustrating a control sequence of a drone control system 100A according to an embodiment of the disclosure.

As illustrated in FIG. 4, the speed-torque converter 142 converts the motor speed command by the flight controller 130 into a torque (value) suitable for the characteristics of the motor. The converted torque value is output to the torque controller 143. Here, since the torque value is proportional to the current value, a current value is substantially output to the torque controller 143. The torque controller 143 may include, or be referred to as, a current controller.

In some examples, a summing circuit 145 may be connected between the speed-torque converter 142 and the torque controller 143 to receive feedback of the current value of the motor 150 proportional to the torque value. The torque value (i.e., current value) commanded by the speed-torque converter 142 and the torque value (i.e., current value) actually applied to the motor 150 are compared with each other by the summing circuit 145, and then, a corrected torque value is output to the torque controller 143. Thus, torque control of the motor 150 may be performed more accurately.

Figure 5A:
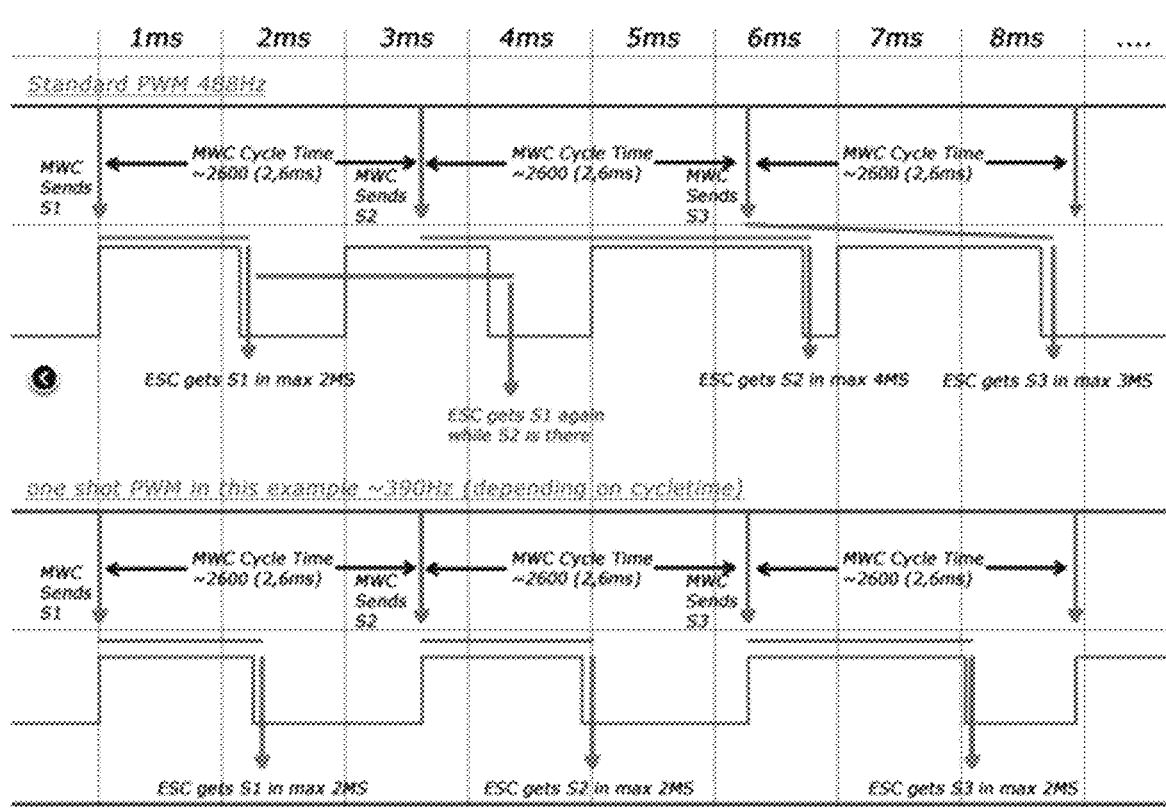
FIGS. 5A and 5B are views illustrating a communication protocol for an example speed control command method of a motor in a drone control system according to an embodiment of the disclosure.
Figure 5B:
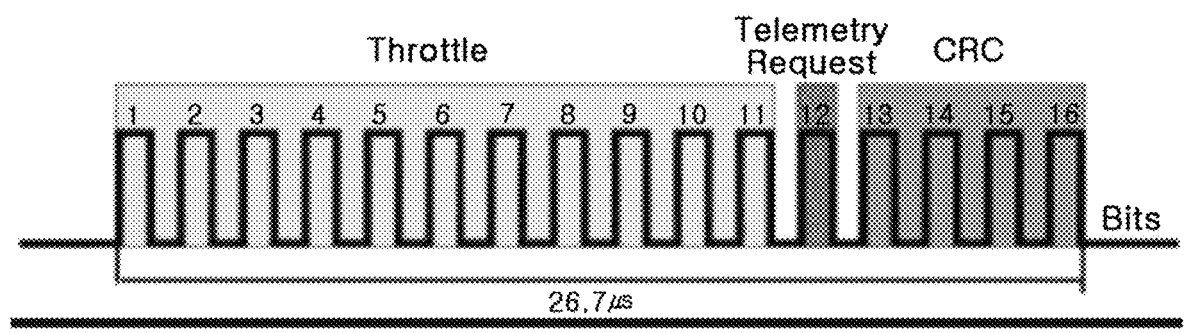

FIGS. 5A and 5B are views illustrating a communication protocol for an example speed control command method of a motor 150 in a drone control system 100A according to an embodiment of the disclosure.

According to an embodiment of the disclosure, the electronic speed controller 140 may convert or scale the motor speed command value received from the flight controller 130 to a torque value while reflecting the torque-speed (TN) curve characteristic to the motor 150 to be used and control the motor 150. In some examples, the motor 150 may include a motor capable of vector control as described above (e.g., BLAC control or field oriented control (FOC)).

In some examples, the motor speed command value input from the flight controller 130 to the electronic speed controller 140 may include one of standard PWM, oneshot125, oneshot42, multishot, Proshot, or Dshot communication protocols.

For example, as illustrated in FIG. 5A, the motor speed command value may include a standard PWM protocol having a duty ratio.

As another example, as illustrated in FIG. 5B, the motor speed command value may include a Dshot protocol. In some examples, first 11 bits represent a throttle value for the control stick of the transmitter, that is, a speed command value to the motor 150, the next one bit represents a telemetry request, and the remaining 4 bits represent a CRC checksum.

In some examples of Dshot protocol, among throttle values, 0-47 are reserved, and 48-2047 are allocated with a resolution of 2000 steps.

According to an embodiment, a motor speed command control value according to the variation in the throttle (transmitter control stick) including a PWM analog signal or Dshot digital signal is converted into a torque command value suitable for the characteristics of the motor and is converted into a torque command control value. Accordingly, in an embodiment of the disclosure, the electronic speed controller 140, that is, the speed-torque converter 142, identifies any one of the communication protocols of standard PWM, one shot PWM, multishot, or Dshot, and may convert the motor speed value into a motor torque value according to the identified communication protocol.

As an example, it is assumed that the maximum RPM and the maximum torque of the motor 150 to be torque-controlled are as follows:

Maximum RPM: 2000 RPM

Maximum torque: 3 Nm

Figure 6:
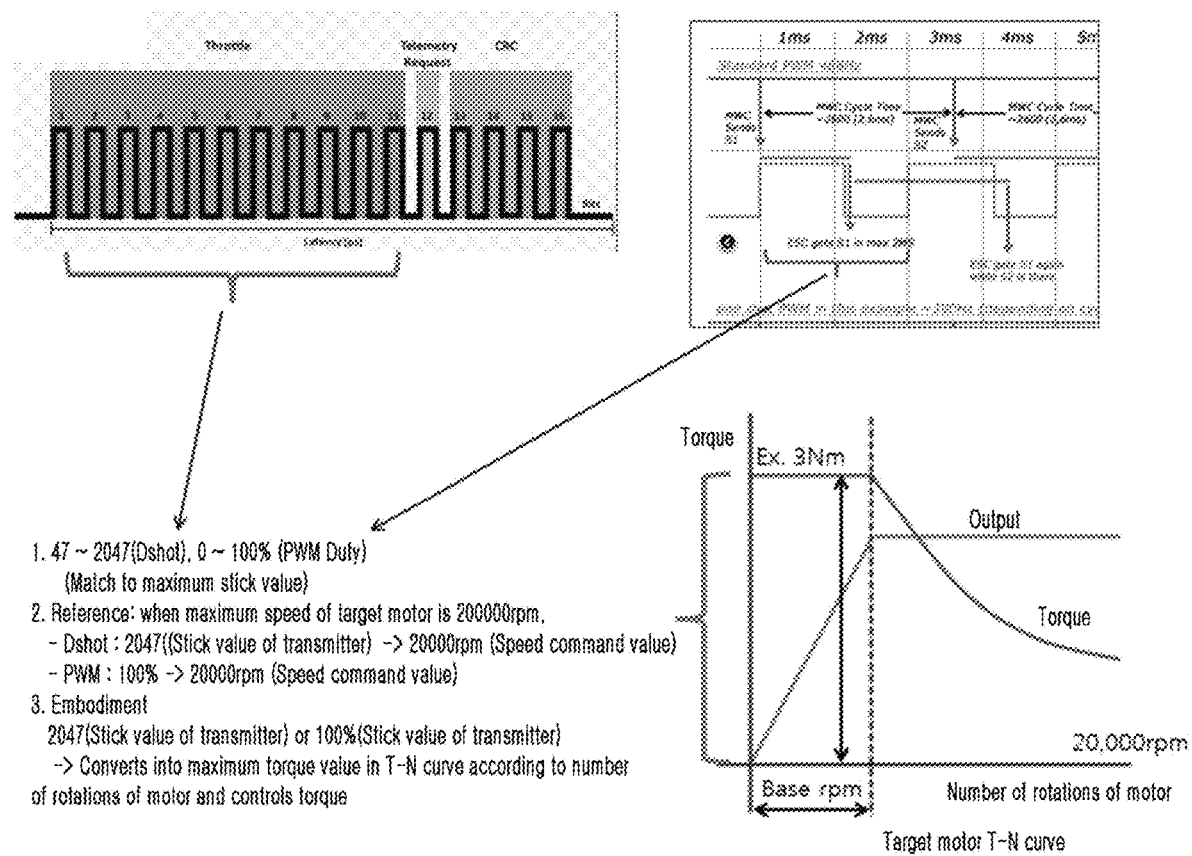
FIG. 6 is a view illustrating an example of torque control of a motor in a drone control system according to an embodiment of the disclosure.

FIG. 6 is a view illustrating an example of speed control of the motor 150 in the drone control system 100A according to an embodiment.

As illustrated in FIG. 6, the maximum control stick value of the transmitter 110 may be matched to 47-2047 (Dshot) in the case of the Dshot protocol and 0-100% in the case of the PWM protocol. When the maximum speed of the target motor 150 is 2000 RPM, the conventional art sets as follows:

Dshot: 2047 (stick value of transmitter 110)→2000 RPM (speed command value)

PWM: 100%→2000 RPM (speed command value)

According to an embodiment, the following settings may be made.

2047 (the control stick value of the transmitter 110) or 100% (the control stick value of the transmitter 110) →converts into the maximum torque value by the T-N curve according to the number of rotations (speed) of the motor 150

Figure 7:
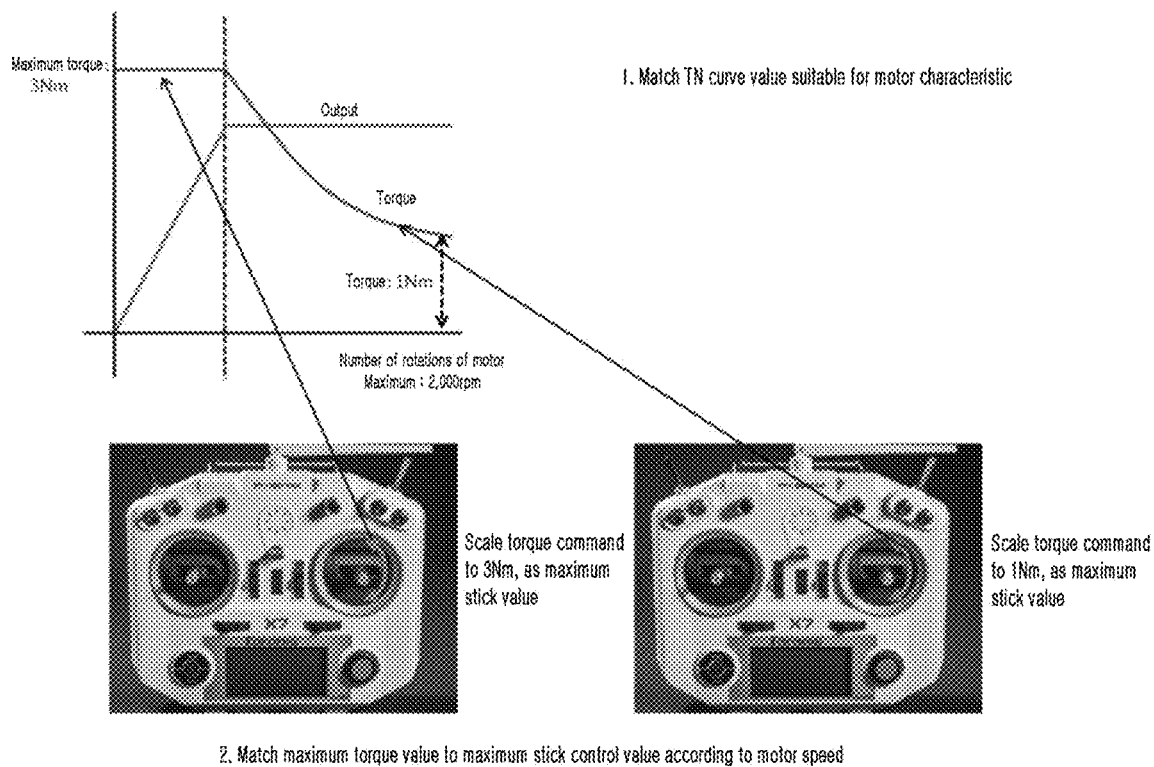
FIG. 7 is a view illustrating an example of motor torque control by stick control in a drone control system according to an embodiment of the disclosure.

FIG. 7 is a view illustrating an example of torque control of the motor 150 by stick control in the drone control system 100A according to an embodiment.

As illustrated in FIG. 7, according to an embodiment of the disclosure, the TN curve value suitable for the characteristics of the motor 150 may be matched, and the maximum torque value may be matched with the maximum stick control value according to the speed of the motor 150. For example, as the maximum stick value, the torque command may be scaled to 3 Nm of the first section or, in the second section, the maximum torque value according to the speed may be scaled according to the TN curve of the motor.

In some examples, in the case of automatic flight that does not require a transmitter, the drone control system according to an embodiment of the disclosure, may include a flight controller 130 that converts a motor speed value into a motor torque value and outputs the motor torque value and an electronic speed controller 140 that receives the motor torque value from the flight controller 130, converts the motor torque value into a power driving value, and outputs the power driving value to the motor. In some examples, the flight controller 130 may include a speed-torque converter that converts the motor speed value into the motor torque value and outputs the motor torque value, and the electronic speed controller 140 may include a torque controller that converts the motor torque value into the motor current value and outputs the motor current value and a power converter that converts the motor current value into the motor power driving value and outputs the motor power driving value.

In some examples, in the drone control system according to an embodiment of the disclosure, the flight controller and the electronic speed controller may be integrated into one system (e.g., system-in-package (SiP)).

Therefore, according to an embodiment of the disclosure, there may be provided a drone control system in which the drone user may directly adjust the torque required in the flight environment, that is, the torque required by the drone motor, with the transmitter control when controlling the control stick of the transmitter. According to an embodiment of the disclosure, there may also be provided a drone control system capable of control with torque commands even in automatic flight as well as control on the transmitter. According to an embodiment of the disclosure, there may also be provided a drone control system controlling the motor with the torque necessary for the flight controller when the drone hovers (automatic drone position control). According to an embodiment of the disclosure, there may also be provided a drone control system in which the torque required for position control and flight speed control of the drone continuously varies when the flight environment (wind or weather changes) continues to change. According to an embodiment of the disclosure, there may also be provided a drone control system which has advantages in position control accuracy and flight speed control as compared with conventional speed controlled drones by allowing the user to directly control the varying motor torque using a transmitter. According to an embodiment of the disclosure, there may also be provided a drone control system capable of enhancing drone control efficiency by adopting a torque control scheme. According to an embodiment of the disclosure, there may also be provided a drone control system capable of increasing drone position control accuracy by adopting a torque control system, thereby suppressing or reducing the drone shaking when the drone hovers. According to an embodiment of the disclosure, there may also be provided a drone control system capable of enhancing control accuracy and flight stability in light of controller bandwidth. According to an embodiment of the disclosure, there may also be provided a drone control system which may enhance system efficiency, thus increasing the battery time of the drone and providing better accuracy in drone position control. According to an embodiment of the disclosure, there may also be provided a drone control system that may reduce drone shaking and thus provides advantages in light of flight stability.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A drone control system in which a drone user directly adjusts torque to control the drone's motor, the system, comprising:

a flight controller receiving a stick control value from a transmitter, converting the stick control value into a motor speed value, and outputting the motor speed value; and an electronic speed controller receiving the motor speed value from the flight controller, converting the motor speed value into a motor torque value, converting the motor torque value into a power driving value, and outputting the power driving value to the motor, wherein the motor speed value output from the flight controller to the electronic speed controller includes a communication protocol, wherein the electronic speed controller identifies the communication protocol and then converts the motor speed value into the motor torque value according to the identified communication protocol, wherein the electronic speed controller includes:

a speed-torque converter converting the motor speed value into the motor torque value using a torque value characteristic for each speed of the motor uniquely designed per motor; a torque controller converting the motor torque value into a motor current value and outputting the converted motor current value; and a power converter converting the motor current value into the motor power driving value and outputting the converted motor power driving value, wherein the torque value characteristic for each speed of the motor is TN curve, wherein in the first section of the TN curve a motor torque is constant while a motor speed increase, and in the second section of the TN curve the motor torque and the motor speed are substantially inversely proportional to each other, wherein the speed-torque converter scales the motor speed value to the motor torque value while reflecting the TN curve by matching maximum stick control value with maximum motor torque value according to the speed of the motor, wherein the motor speed value is a motor speed command value according to the variation in the stick control value, and wherein the motor torque value is a motor torque command value converted by scaling the motor speed value according to the TN curve.

2. The drone control system of claim 1, further comprising a summing circuit between the speed-torque converter and the torque controller and receiving feedback of a current value of the motor proportional to the torque value.

3. The drone control system of claim 1, wherein the communication protocol includes one of standard PWM, oneshot125, oneshot42, multishot, Proshot or Dshot communication protocols.

4. The drone control system of claim 1, wherein the motor includes a motor controlled by a vector control method.

5. The drone control system of claim 1, wherein the flight controller and the electronic speed controller are integrated into one system.

6. A drone control system in which a drone user directly adjusts torque to control the drone's motor, the system, comprising:

a flight controller receiving a stick control value from a transmitter, converting the stick control value into a motor speed value, converting the motor speed value into a motor torque value, and outputting the motor torque value; and an electronic speed controller receiving the motor torque value from the flight controller, converting the motor torque value into a power driving value, and outputting the power driving value to the motor, wherein the motor speed value output from the flight controller to the electronic speed controller includes a communication protocol, wherein the electronic speed controller identifies the communication protocol and then converts the motor speed value into the motor torque value according to the identified communication protocol, wherein the flight controller includes a speed-torque converter converting the motor speed value into the motor torque value using a torque value characteristic for each speed of the motor uniquely designed per motor, wherein the electronic speed controller includes: a torque controller converting the motor torque value into a motor current value and outputting the converted motor current value; and a power converter converting the motor current value into the motor power driving value and outputting the converted motor power driving value, wherein the torque value characteristic for each speed of the motor is TN curve, wherein in the first section of the TN curve a motor torque is constant while a motor speed increase, and in the second section of the TN curve the motor torque and the motor speed are substantially inversely proportional to each other, wherein the speed-torque converter scales the motor speed value to the motor torque value while reflecting the TN curve by matching maximum stick control value with maximum motor torque value according to the speed of the motor, wherein the motor speed value is a motor speed command value according to the variation in the stick control value, and wherein the motor torque value is a motor torque command value converted by scaling the motor speed value according to the TN curve.

7. The drone control system of claim 6, further comprising a summing circuit between the speed-torque converter and the torque controller and receiving feedback of a current value of the motor proportional to the torque value.

8. The drone control system of claim 6, wherein the motor includes a motor controlled by a vector control method.

9. The drone control system of claim 6, wherein the flight controller and the electronic speed controller are integrated into one system.

10. A drone control system in which a drone user directly adjusts torque to control the drone's motor, the system, comprising:

a flight controller converting a motor speed value into a motor torque value and outputting the motor torque value; and an electronic speed controller receiving the motor torque value from the flight controller, converting the motor torque value into a power driving value, and outputting the power driving value to the motor, wherein the motor speed value output from the flight controller to the electronic speed controller includes a communication protocol, wherein the electronic speed controller identifies the communication protocol and then converts the motor speed value into the motor torque value according to the identified communication protocol, wherein the flight controller includes a speed-torque converter converting the motor speed value into the motor torque value using a torque value characteristic for each speed of the motor uniquely designed per motor, wherein the electronic speed controller includes: a torque controller converting the motor torque value into a motor current value and outputting the converted motor current value; and a power converter converting the motor current value into the motor power driving value and outputting the converted motor power driving value, wherein the torque value characteristic for each speed of the motor is TN curve, wherein in the first section of the TN curve a motor torque is constant while a motor speed increase, and in the second section of the TN curve the motor torque and the motor speed are substantially inversely proportional to each other, wherein the speed-torque converter scales the motor speed value to the motor torque value while reflecting the TN curve by matching maximum stick control value with maximum motor torque value according to the speed of the motor, wherein the motor speed value is a motor speed command value according to the variation in the stick control value, and wherein the motor torque value is a motor torque command value converted by scaling the motor speed value according to the TN curve.

11. The drone control system of claim 10, wherein the flight controller and the electronic speed controller are integrated into one system.

* * * * *